United States Patent [19]

Etzbach et al.

[11] Patent Number: 4,904,777
[45] Date of Patent: Feb. 27, 1990

[54] MONO AZO DYES CONTAINING AS DIAZO RADICAL A THIOPHENE RADICAL WHICH POSSESSES AN OXIME GROUP

[75] Inventors: Karl-Heinz Etzbach, Frankenthal; Guenter Hansen; Ernst Schefczik, both of Ludwigshafen; Helmut Reichelt, Niederkirchen, all of Fed. Rep. of Germany

[73] Assignee: BASF Aktiengesellschaft, Ludwigshafen, Fed. Rep. of Germany

[21] Appl. No.: 109,525

[22] Filed: Oct. 19, 1987

[30] Foreign Application Priority Data

Nov. 4, 1986 [DE] Fed. Rep. of Germany ....... 3637438

[51] Int. Cl.$^4$ ................ C09B 29/033; D06P 1/04; D06P 3/52; D06P 3/40
[52] U.S. Cl. .................... 534/738; 534/887; 534/630; 549/68
[58] Field of Search ............... 534/738, 630

[56] References Cited

FOREIGN PATENT DOCUMENTS

| | | | |
|---|---|---|---|
| 3517365 | 11/1986 | Fed. Rep. of Germany | 534/753 |
| 1543724 | 4/1979 | United Kingdom | 8/662 |
| 2071707 | 9/1981 | United Kingdom | 8/662 |
| 2163768 | 3/1986 | United Kingdom | 534/738 |

OTHER PUBLICATIONS

Houben–Weyl, "Methoden der Organischen Chemie", vol. 10/1, pp. 1181–1226, (1971).

*Primary Examiner*—Floyd D. Higel
*Attorney, Agent, or Firm*—Oblon, Spivak, McClelland, Maier & Neustadt

[57] ABSTRACT

A thiophene-containing azo dye of the formula

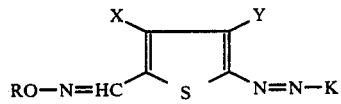

where R is substituted or unsubstituted alkyl, alkenyl, cycloalkyl or phenyl, X is hydrogen, halogen, hydroxyl, unsubstituted or substituted alkoxy, cycloalkoxy, phenoxy, mercapto, alkylthio, phenylthio, alkylsulfonyl, phenylsulfonyl or phenyl and Y is cyano, nitro, alkanoyl, substituted or unsubstituted benzoyl, alkylsulfonyl, phenylsulfonyl, Co-Z, where Z is unsubstituted or substituted phenoxy, amino, mono- or dialkylamino, pyrrolidino, piperidino, morpholino or N-alkylpiperazino, and K is the radical of a coupling component is used as dyes for dyeing fiber material.

2 Claims, No Drawings

MONO AZO DYES CONTAINING AS DIAZO RADICAL A THIOPHENE RADICAL WHICH POSSESSES AN OXIME GROUP

The present invention relates to a novel thiophene-containing azo dye whose diazo component is a thiophene which has an oxime ether group in the 4-position on the thiophene ring, and to the use thereof for dyeing fiber material.

DE-A-3,517,365 discloses azo dyes whose diazo component derives from 2-aminothiophene derivatives.

It is an object of the present invention to provide a novel thiophene azo dye which has advantageous application properties.

We have found that this object is achieved with a thiophene-containing azo dye of the formula I

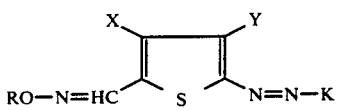

in which R is substituted or unsubstituted $C_1$–$C_{12}$-alkyl, substituted or unsubstituted $C_3$–$C_6$-alkenyl, substituted or unsubstituted $C_5$–$C_7$-cycloalkyl or substituted or unsubstituted phenyl, X is hydrogen, halogen, hydroxyl, unsubstituted or phenyl-substituted $C_1$–$C_8$-alkoxy, $C_5$–$C_7$-cycloalkoxy, substituted or unsubstituted phenoxy, mercapto, unsubstituted or hydroxyl-, $C_1$–$C_4$-alkoxycarbonyl- or phenyl-substituted $C_1$–$C_8$-alkylthio, $C_5$–$C_7$-cycloalkylthio, substituted or unsubstituted phenylthio, $C_1$–$C_4$-alkylsulfonyl, substituted or unsubstituted phenylsulfonyl, $C_1$–$C_8$-alkyl or substituted or unsubstituted phenyl, Y is cyano, nitro, $C_1$–$C_{10}$-alkanoyl, substituted or unsubstituted benzoyl, $C_1$–$C_4$-alkylsulfonyl, substituted or unsubstituted phenylsulfonyl or CO—Z where Z is hydroxyl, unsubstituted or hydroxyl- or $C_1$–$C_4$-alkoxy-substituted $C_1$–$C_8$-alkoxy, substituted or unsubstituted phenoxy, amino, $C_1$–$C_8$-mono- or dialkylamino, pyrrolidino, piperidino, morpholino or N-($C_1$–$C_4$-alkyl)piperazino and K is the radical of a coupling component.

Any alkyl or alkenyl group appearing in the above radicals can be straight-chain or branched.

In any substituted phenyl appearing in the abovementioned formula I, the substituents can be, unless otherwise stated, halogen, in particular fluorine, chlorine or bromine, $C_1$–$C_4$-alkyl or $C_1$–$C_4$-alkoxy.

Possible substituents in R are chlorine, bromine, $C_1$–$C_4$-alkoxy, substituted or unsubstituted phenyl or phenoxy. Specific examples of R are: $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{11}H_{23}$, $C_{12}H_{25}$, $C_2H_4Cl$, $C_2H_4OCH_3$, $C_2H_4OC_6H_5$, $CH_2CH=CH_2$, $CH_2CH=CHCl$, $CH_2C_6H_5$, $CH_2C_6H_4CH_3$, $CH_2C_6H_4Cl$, $CH_2C_6H_4OCH_3$, $C_2H_4C_6H_5$, cyclopentyl, cyclohexyl, cycloheptyl, $C_6H_5$ or $C_6H_4CH_3$.

X is for example: hydrogen, fluorine, chlorine, bromine, OH, $OCH_3$, $OC_2H_5$, $OC_3H_7$, $OC_4H_9$, $OC_5H_{11}$, $OC_6H_{13}$, $OC_7H_{15}$, $OC_8H_{17}$, $OC_5H_9$, $OC_6H_{11}$, $OC_7H_{13}$, $OCH_2C_6H_5$, $OC_2H_4C_6H_5$, $OC_6H_5$, $OC_6H_4CH_3$, $OC_6H_4Cl$, SH, $SCH_3$, $SC_2H_5$, $SC_3H_7$, $SC_4H_9$, $SC_5H_{11}$, $SC_6H_{13}$, $SC_7H_{15}$, $SC_8H_{17}$, $SC_2H_4OH$, $SCH_2COOCH_3$, $SCH_2COOC_2H_5$, $SC_6H_{11}$, $SCH_2C_6H_5$, $SC_6H_5$, $SC_6H_4CH_3$, $CH_3SO_2$, $C_2H_5SO_2$, $C_4H_9SO_2$, $C_6H_5SO_2$, $Cl-C_6H_4SO_2$, $C_4H_9-C_6H_4SO_2$, $CH_3$, $C_2H_5$, $C_3H_7$, $C_4H_9$, $C_5H_{11}$, $C_6H_{13}$, $C_7H_{15}$, $C_8H_{17}$, $C_6H_5$, $CH_3C_6H_4$ or $CH_3OC_6H_4$.

Y can be for example in addition to those already mentioned:

$CH_3CO$, $C_2H_5CO$, $C_3H_7CO$, $C_4H_9CO$, $C_5H_{11}CO$, $C_6H_{13}CO$, $C_7H_{15}CO$, $OCCH(C_2H_5)(C_4H_9)$, $C_8H_{17}CO$, $C_9H_{19}CO$, $C_6H_5CO$, $CH_3C_6H_4CO$, $ClC_6H_4CO$, $(CH_3)_2C_6H_3CO$, $H_2COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$,

COOH, $COOCH_3$, $COOC_2H_5$, $COOC_3H_7$, $COOC_4H_9$, $COOC_5H_{11}$, $COOC_6H_{13}$, $COOC_7H_{15}$, $COOC_8H_{17}$, $COOCH_2CH(C_2H_5)(C_4H_9)$, $COOC_2H_4OH$, $COOC_3H_6OH$, $COOC_2H_4OCH_3$, $COOC_2H_4OCH_2H_5$, $COOC_2H_4OC_4H_9$, $COOC_6H_5$, $COOC_6H_4CH_3$, $CONH_2$, $CONHCH_3$, $CONHC_2H_5$, $CONHC_3H_7$, $CONHC_4H_9$, $CONHC_6H_{13}$, $CONHC_8H_{17}$, $CON(CH_3)_2$, $CON(C_2H_5)_2$, $CON(C_3H_7)_2$, $CON(C_4H_9)_2$, $CON(CH_3)(C_2H_5)$, CON-pyrrolidino, CON-piperidino, CON-morpholino or CON-(N-methylpiperazino).

In the formula I, K is the radical of a coupling component. These components conform to the formula KH and come from the aniline, naphthylamine, pyrazolone, aminopyrazole, indole, thiazole, thiophene, tetrahydroquinoline or pyridine series.

They conform in particular to the general formulae II to X:

$$\text{(II)} \qquad \text{(III)}$$

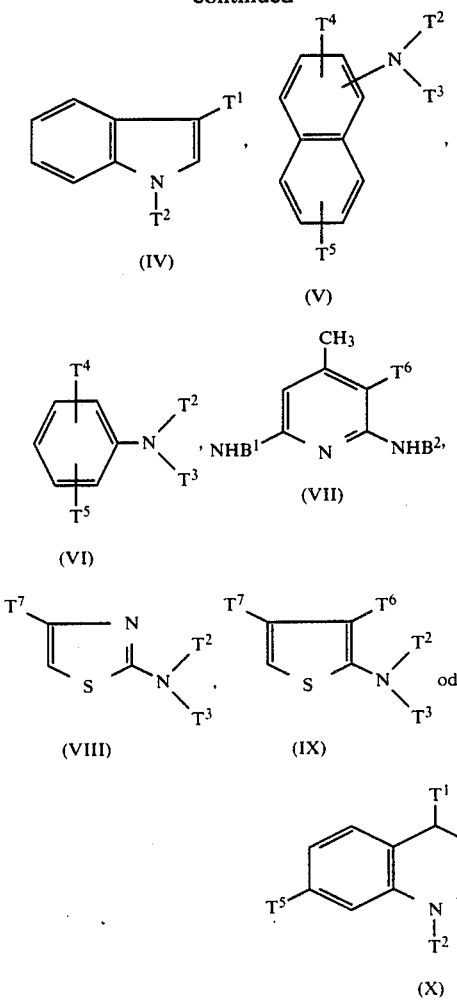

In these formulae, $B^1$ is hydrogen or $B^2$, $B^2$ is substituted or unsubstituted $C_1$-$C_8$-alkyl, substituted or unsubstituted $C_5$-$C_7$-cycloalkyl, substituted or unsubstituted phenyl, $C_3$-$C_6$-alkenyl or acyl, $T^1$ is hydrogen, unsubstituted or phenyl-substituted $C_1$-$C_4$-alkyl or substituted or unsubstituted phenyl, $T^2$ is hydrogen or $T^3$, $T^3$ is substituted or unsubstituted $C_1$-$C_6$-alkyl, $C_5$-$C_7$-cycloalkyl, $C_3$-$C_6$-alkenyl or phenyl, $T^4$ and $T^5$ are each, independently of the other, hydrogen, $C_1$-$C_4$-alkyl, $C_1$-$C_4$-alkoxy, phenoxy, benzyloxy, halogen, $C_1$-$C_4$-alkylsulfonylamino, $C_1$-$C_4$-dialkylaminosulfonylamino, $C_1$-$C_4$-alkoxycarbonylamino, substituted or unsubstituted benzoylamino or $C_1$-$C_6$-alkanoylamino, $T^6$ is cyano, nitro, acetyl, carbamoyl, $C_1$-$C_4$-mono- or -dialkylcarbamoyl, $C_1$-$C_4$-alkoxycarbonyl or $C_1$-$C_4$-alkoxyethoxycarbonyl and $T^7$ is unsubstituted or cyano-, $C_1$-$C_4$-alkoxycarbonyl- or phenyl-substituted $C_1$-$C_{10}$-alkyl, phenyl, halogen, nitro, unsubstituted or $C_1$-$C_4$-alkoxy-substituted $C_1$-$C_{10}$-alkoxy, phenoxy, benzyloxy, $C_1$-$C_4$-alkylthio, phenylthio, $C_1$-$C_4$-mono- or dialkylamino, $C_1$-$C_5$-alkanoylamino or $C_1$-$C_4$-alkoxycarbonyl.

In a substituted $C_1$-$C_8$-alkyl $B^2$, possible substituents are chlorine, bromine, hydroxyl, $C_1$-$C_8$-alkoxy, phenoxy, substituted or unsubstituted phenyl, cyano, carboxyl, $C_1$-$C_8$-alkanoyloxy, $C_1$-$C_8$-alkanoyloxy-$C_1$-$C_4$-alkoxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxy-$C_1$-$C_8$-alkanoyloxy, phenoxy-$C_1$-$C_8$-alkanoyloxy, $C_1$-$C_8$-alkoxycarbonyloxy, $C_1$-$C_8$-alkoxy-$C_1$-$C_8$-alkoxycarbonyloxy, benzyloxycarbonyloxy, phenethoxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxy-$C_1$-$C_8$-alkoxycarbonyl, phenoxycarbonyl, benzyloxycarbonyl, phenoxy-$C_1$-$C_4$-alkoxy and phenylethoxycarbonyl.

In a substituted $C_5$-$C_7$-cycloalkyl $B^2$, possible substituents are $C_1$-$C_4$-alkyl, $C_1$-$C_4$-alkoxy, $C_2$-$C_4$-hydroxyalkyl and hydroxyl.

An acyl $B^2$ is for the purposes of the present invention substituted or unsubstituted benzoyl, substituted or unsubstituted phenylsulfonyl, unsubstituted or phenyl-substituted $C_1$-$C_{10}$-alkanoyl or $C_1$-$C_6$-alkylsulfonyl.

Specific examples of $B^2$ are:

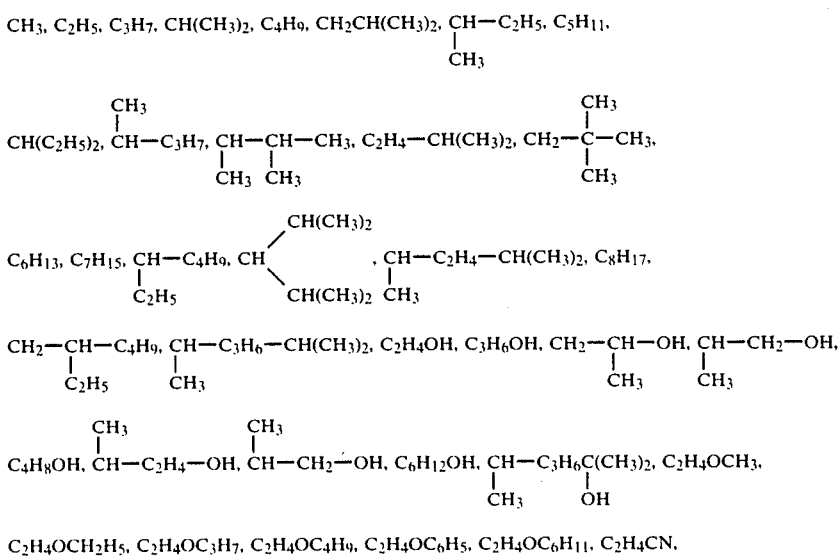

-continued

C₃H₆OC₃H₇, C₃H₆OC₄H₉, C₃H₆OCH₂—CH(C₂H₅)—C₄H₉, C₃H₆OC₆H₁₁, C₃H₆OC₈H₁₇,

C₃H₆OCH₂C₆H₅, C₃H₆OC₂H₄C₆H₅, C₃H₆OCH₂H₄OC₆H₅, C₃H₆OC₆H₅, C₃H₆OC₈H₁₇,

C₃H₆OC₄H₈OH, C₃H₆OC₂H₄OCH₃, C₃H₆OC₂H₄OC₂H₅, C₃H₆OC₂H₄OCH(CH₃)₂,

C₃H₆OC₂H₄OC₄H₉, C₃H₆OC₂H₄OCH₂C₆H₅, C₃H₆OC₂H₄OC₆H₅, C₃H₆OC₄H₈OCH₃,

C₃H₆OC₄H₈OC₂H₅, C₃H₆OC₄H₈OC₄H₉, CH(CH₃)—CH₂OCH₃, CH(CH₃)CH₂OC₄H₉, CH(CH₃)—CH₂OC₆H₅,

CH(CH₃)CH₂OCH₂C₆H₅, CH(CH₃)—C₂H₄OCH₃, CH(C₂H₅)—CH₂—OCH₃, CH(CH₃)—CH(OCH₃)₂, CH₂CH(CH₃)OCH₃,

CH₂—CH(CH₃)—OC₂H₅, CH₂—CH(CH₃)—OC₄H₉, CH₂—CH(CH₃)—OC₆H₅,

C₃H₆OCH(CH₃)—CH₂OCH₃, C₃H₆OCH(CH₃)OC₂H₅, CH₃H₆OCH₂CH(CH₃)OCH₃,

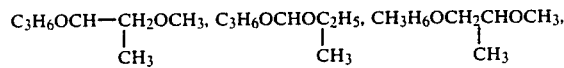
, CH₂—C₆H₅, C₂H₄—C₆H₅,

CH₂CH(CH₃)—C₆H₅, CHCH₂H₄(CH₃)—C₆H₅, C₂H₄CH(CH₃)—C₆H₅, CH₂CH(C₂H₅)—C₆H₅(OH), CH(C₂H₅)—C₆H₅, CH(C₃H₇)—C₆H₅

CH₂—C₆H₄—CH₃, CH₂—C₆H₄—OCH₃, C₂H₄—C₆H₄—CH₃, C₂H₄—C₆H₄—OCH₃,

C₆H₅, C₆H₄CH₃, C₆H₃(CH₃)₂, C₆H₄OCH₃, C₆H₃(OCH₃)₂, C₆H₄Cl, C₆H₂(OCH₃)₂Cl,

CH₂CH=CH₂, CH₂COOCH₃, (CH₂)₅COOCH₃, (CH₂)₅COOC₂H₅(CH₂)₅COOC₄H₉, (CH₂)₅COOCH₂CH(C₂H₅)(C₄H₉), (CH₂)₂OCHO, (CH₂)₂OCO(CH₂)ₙCH₃, (C₂H₄O)₂CHO, (C₂H₄O)₂CO(CH₂)ₙCH₃, (CH₂)₃O(CH₂)₂OCHO, (CH₂)₃O(CH₂)₂OCO(CH₂)ₙCH₃, (CH₂)₂O(CH₂)₄OCHO, (CH₂)₂O(CH₂)₄OCO(CH₂)ₙCH₃

(where n can be 0 to 7)

(CH₂)₂OCOCH(C₂H₅)(C₄H₉), (CH₂)₂OCOC₆H₅, (CH₂)₂OCOC₆H₄CH₃, (CH₂)₂OCOC₆H₄Cl, (CH₂)₂OCONHCH₃, (CH₂)₂OCONHC₄H₉, (CH₂)₂OCONHCH₂CH(C₂H₅)(C₄H₉)

(CH₂)₂OCONHC₆H₅, CHO, CH₃CO, C₂H₅CO, C₃H₇CO, C₄H₉CO, C₅H₁₁CO, C₆H₁₃CO,

C₇H₁₅CO, C₈H₁₇CO, C₉H₁₉CO, C₁₀H₂₁CO, C₆H₅CO, CH₃C₆H₄CO, C₆H₅CH₂CO, CH₃SO₂,

C₂H₅SO₂, C₆H₅SO₂ or CH₃C₆H₄SO₂.

Specific examples of $T^1$ are hydrogen, methyl, ethyl, propyl, butyl, benzyl, phenethyl, phenyl, o-, m- or p-tolyl and o-, m- or p-chlorophenyl.

In a substituted $C_1$-$C_6$-alkyl $T^3$, possible substituents are chlorine, bromine, hydroxyl, $C_1$-$C_8$-alkoxy, phenoxy, cyano, carboxyl, phenyl, $C_1$-$C_8$-alkanoyloxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxy-$C_1$-$C_8$-alkanoyloxy, phenoxy-$C_1$-$C_8$-alkanoyloxy, $C_1$-$C_8$-alkoxycarbonyloxy, $C_1$-$C_8$-alkoxy-$C_1$-$C_8$-alkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxy-$C_1$–$C_8$-alkoxycarbonyl, phenoxycarbonyl, benzyloxycarbonyl, phenoxy-$C_1$–$C_4$-alkoxy and phenethyloxycarbonyl.

Specific examples of $T^3$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonyloxyethyl, 2-benzoyloxyethyl, cyclopentyl, cyclohexyl, cycloheptyl, benzyl, phenylethyl and phenyl.

$T^4$ and $T^5$ are for example hydrogen, methyl, ethyl, propyl, bromine, chlorine, methoxy, ethoxy, phenoxy, benzyloxy, methylsulfonylamino, ethylsulfonylamino, isopropylsulfonylamino, butylsulfonylamino, dimethylaminosulfonylamino, diethylaminosulfonylamino, methoxycarbonylamino, ethoxycarbonylamino, propoxycarbonylamino, isobutoxycarbonylamino, formylamino, acetylamino, propionylamino, butyrylamino, pentanoylamino, hexanoylamino, benzoylamino, 4-methylbenzoylamino, 4-chlorobenzoylamino or 2-methoxybenzoylamino.

$T^6$ can be for example, in addition to those mentioned above, carbamoyl, methylcarbamoyl, dimethylcarbamoyl, ethylcarbamoyl, diethylcarbamoyl, methoxycarbonyl, ethoxycarbonyl, n- or i-propoxycarbonyl, n-, i- or secbutoxycarbonyl, methoxyethoxycarbonyl, ethoxyethoxycarbonyl, n- or i-propoxyethoxycarbonyl or n-, i- or secbutoxyethoxycarbonyl.

Examples of $T^7$ are methyl, ethyl, propyl, isopropyl, butyl, isobutyl, sec-butyl, tert-butyl, pentyl, hexyl, heptyl, octyl, 2-ethylhexyl, nonyl, decyl, cyanomethyl, methoxycarbonylmethyl, ethoxycarbonylmethyl, benzyl, phenylethyl, phenyl, chlorine, bromine, nitro, methoxy, ethoxy, propoxy, isopropoxy, butoxy, isobutoxy, pentyloxy, hexyloxy, heptyloxy, 2-ethylhexyloxy, nonyloxy, decyloxy, 2-methoxyethoxy, 2-ethoxyethoxy, 2-propoxyethoxy, 2-butoxyethoxy, phenoxy, benzyloxy, methylthio, ethylthio, propylthio, butylthio, isobutylthio, sec-butylthio, phenylthio, methylamino, dimethylamino, ethylamino, diethylamino, propylamino, dipropylamino, isopropylamino, diisopropylamino, butylamino, dibutylamino, methylethylamino, formylamino, acetylamino, propionylamino, butyrylamino, pentanoylamino, methoxycarbonyl, ethoxycarbonyl, propoxycarbonyl, isopropoxycarbonyl, butoxycarbonyl, isobutoxycarbonyl, sec-butoxycarbonyl and tert-butoxycarbonyl.

Particular preference is given to thiophene-containing azo dyes of the formula I where R is $C_1$–$C_8$-alkyl or $C_3$–$C_5$-alkenyl, X is hydrogen, chlorine, bromine, $C_1$–$C_4$-alkoxy, phenylthio, phenylsulfonyl, $C_1$–$C_4$-alkyl or phenyl, Y is cyano or CO—Z where Z is $C_1$–$C_4$-alkoxy, and K is the radical of a coupling component of the aniline, pyridine, thiophene, thiazole or aminopyrazole series. These coupling components conform to the formula II, III, VI, VII, VIII or IX.

The novel dyes of the formula I are suitable for dyeing fiber material, in particular polyesters, nylons, cellulose esters or blend fabrics of polyesters and cellulose fibers. On these fibers, they produce dyeings in yellow to greenish blue shades which, in general, have good to very good fastness properties, in particular on polyesters.

Given a suitable constitution, the dyes are dischargeable under reducing and/or under alkaline and reducing conditions in a conventional manner as described in GB-A-1,543,724 and GB-A-2,071,707.

To prepare a compound of the formula I, a diazonium compound of an amine of the formula XI

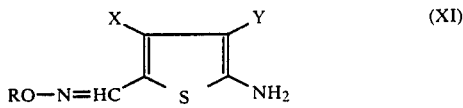

where R, X and Y each have the abovmentioned meanings, can be reacted in a conventional manner with a coupling component of the formula HK.

An amine of the formula XI is obtained by reacting a compound of the formula XII

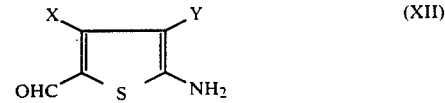

where X and Y each have the abovementioned meanings, with an appropriate hydroxylamine ether in a conventional manner. The preparation of hydroxylamine ethers is known and is described for example in Houben-Weyl, "Methoden der organischen Chemie", volume 10/1, page 1181 et seq., (1971).

Further details of the preparation can be found in the Examples, which are intended to illustrate the invention in more detail. In the Examples, percentages are by weight, unless otherwise stated.

EXAMPLE 1

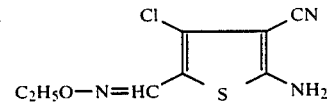

37.3 g of 2-amino-4-chloro-3-cyano-5-formylthiophene were heated together with 250 ml of glacial acetic acid, 26.8 g of 50% strength aqueous O-ethylhydroxylamine and 10 drops of 85% strength sulfuric acid under reflux for 1.5 hours. After cooling down, the light brown dye was filtered off with suction, washed with 50 ml of glacial acetic and 1,000 ml of water and dried at 60° C. under reduced pressure to give 37.6 g (82% of theory) of 2-amino-4-chloro-3-cyano-5-(O-ethylaldoximino)thiophene in the form of light brown crystals. A sample recrystallized from ethanol had a melting point of 221°–223° C. and the following analytical values: C₈H₈ClN₃OS (229.5)

calculated: C 41.83 H 3.49 Cl 15.47 N 18.30 O 6.97 S 13.94%. found: C 41.7 H 3.4 Cl 15.9 N 17.9 O 7.3 S 13.8%.

IR and $^1$H-NMR spectra are in conformity with the structure.

Table 1 gives 2-amino-5-aldoximinothiophenes of the formula

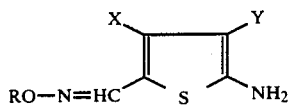

which are obtained in a similar manner.

TABLE 1

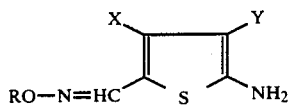

| Ex. No. | R | X | Y |
|---|---|---|---|
| 2 | CH₃ | Cl | CN |
| 3 | C₄H₉ | Cl | CN |
| 4 | CH₂C₆H₅ | Cl | CN |
| 5 | C₂H₅ | SC₆H₅ | CN |
| 6 | C₂H₅ | SO₂C₆H₅ | CN |
| 7 | C₄H₉ | OC₂H₅ | CN |
| 8 | i-C₃H₇ | Br | CN |
| 9 | CH₂CH=CH₂ | Cl | CN |
| 10 | C₂H₅ | Cl | CO₂C₂H₅ |
| 11 | C₃H₇ | H | CN |
| 12 | CH₂C₆H₅ | CH₃ | CN |
| 13 | CH₃ | C₆H₅ | CN |

EXAMPLE 14

5.7 g of 2-amino-4-chloro-3-cyano-5-(O-ethylaldoximino)thiophene (see Example 1) were suspended in 40 ml of of 3:1 glacial acetic acid/propionic acid. 8.3 g of 40% strength nitrosyl sulfuric acid were slowly added at from 0° to 5° C. After stirring for two hours at from 0° to 5° C. this diazonium salt solution was added dropwise to 5.9 g of 3-(N,N-diethylamino)-1-acetanilide in 100 ml of water, 20 ml of hydrochloric acid, 0.5 g of sulfamic acid and 125 g of ice. The dye suspension was stirred at from 0° to 5° C. for 4 hours, and the dye of the formula

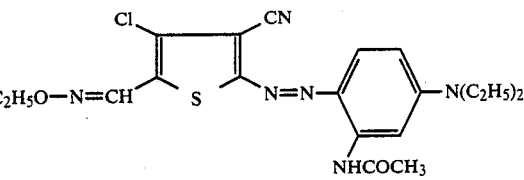

was then filtered off with suction, washed with water until neutral and dried. Yield: 9.6 g. The dye dyes polyester fiber material in blue shades having good fastness properties. λ max (CH₂Cl₂): 580 nm.

EXAMPLE 15

Example 14 was repeated, except that the coupling component 3-(N,N-diethylamino)-1-acetanilide was replaced by 3-(N,N-diethylamino)-1-methoxyacetanilide, affording 9.8 g of the dye of the formula

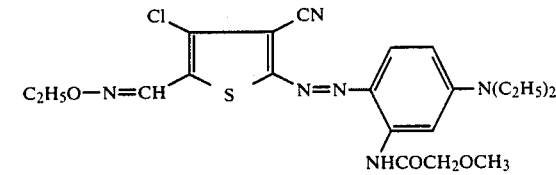

which dyes polyester fiber material in fast, blue shades. λ max (CH₂Cl₂): 588 nm.

Table 2 lists dyes of the formula

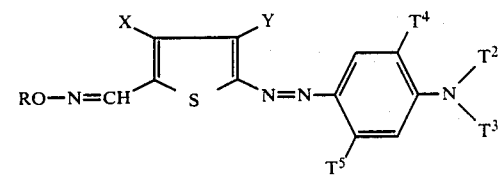

which are obtained in a similar manner.

| Ex. No. | R | X | Y | T⁵ | T⁴ | T³ | T² | Hue on PES |
|---|---|---|---|---|---|---|---|---|
| 16 | C₂H₅ | Cl | CN | CH₃ | H | C₂H₅ | C₂H₅ | reddish blue |
| 17 | C₂H₅ | Cl | CN | CH₃ | H | C₄H₉ | C₄H₉ | reddish blue |
| 18 | C₂H₅ | Cl | CN | NHCOCH₂Cl | H | C₂H₅ | C₂H₅ | blue |
| 19 | C₂H₅ | Cl | CN | NHCOC₂H₅ | H | C₂H₅ | C₂H₅ | blue |
| 20 | C₂H₅ | Cl | CN | NHCOCH₃ | H | C₄H₉ | C₄H₉ | blue |
| 21 | C₂H₅ | Cl | CN | NHCOCH₃ | OCH₃ | C₂H₅ | C₂H₅ | greenish blue |
| 22 | C₂H₅ | Cl | CN | NHCOCH₃ | OC₂H₅ | C₂H₅ | C₂H₅ | greenish blue |
| 23 | C₂H₅ | Cl | CN | NHCOCH₃ | OCH₃ | C₂H₄OCOCH₃ | C₂H₄OCOCH₃ | greenish blue |
| 24 | C₂H₅ | Cl | CN | NHCOCH₃ | OCH₃ | C₂H₄CN | CH₂CH=CH₂ | greenish blue |
| 25 | C₂H₅ | Cl | CN | NHCOCH₃ | H | C₂H₄OCH₃ | C₂H₅ | blue |
| 26 | C₂H₅ | Cl | CN | NHCOCH₃ | H | C₂H₄OCH₃ | C₂H₄OCH₃ | blue |
| 27 | C₂H₅ | Cl | CN | NHCOCH₃ | H | C₄H₈OCOCH₃ | C₄H₈OCOCH₃ | blue |
| 28 | C₂H₅ | Cl | CN | NHCOCH₃ | H | CH₂CH=CH₂ | CH₂CH=CH₂ | blue |
| 29 | C₂H₅ | Cl | CN | NHCOCH₂CN | H | C₂H₅ | C₂H₅ | blue |
| 30 | C₂H₅ | Cl | CN | NHCOCH₂C₆H₅ | H | n-C₃H₇ | n-C₃H₇ | blue |
| 31 | C₂H₅ | Cl | CN | CH₃ | H | C₂H₅ | C₂H₄OH | reddish |

-continued

| Ex. No. | R | X | Y | $T^5$ | $T^4$ | $T^3$ | $T^2$ | Hue on PES |
|---|---|---|---|---|---|---|---|---|
| 32 | $C_2H_5$ | Cl | CN | $CH_3$ | H | $C_2H_4OH$ | $C_2H_4OH$ | blue bluish violet |
| 33 | $C_2H_5$ | Cl | CN | $NHCOCH_3$ | H | $C_2H_4OCOCH_3$ | $C_2H_4OCOCH_3$ | reddish blue |
| 34 | $C_2H_5$ | Cl | CN | $CH_3$ | $OCH_3$ | $C_2H_4OCOCH_3$ | $C_2H_4OCOCH_3$ | blue |
| 35 | $C_2H_5$ | Cl | CN | H | H | $C_2H_5$ | $C_6H_5$ | bluish violet |
| 36 | $C_2H_5$ | Cl | CN | $NHSO_2CH_3$ | H | $C_2H_5$ | $C_2H_5$ | blue |
| 37 | $C_2H_5$ | Cl | CN | $NHCOC_2H_5$ | H | $C_2H_4OH$ | $C_2H_4OH$ | blue |
| 38 | $C_2H_5$ | Cl | CN | H | $OCH_3$ | $C_2H_5$ | $C_2H_5$ | blue |
| 39 | $C_2H_5$ | Cl | CN | $CH_3$ | H | $C_2H_5$ | $C_2H_4CN$ | bluish violet |
| 40 | $C_2H_5$ | Cl | CN | $NHCOOC_2H_5$ | H | $C_2H_5$ | $C_2H_4OH$ | reddish blue |
| 41 | $C_2H_5$ | Cl | CN | H | $OCH_3$ | $C_2H_4OCOCH_3$ | $C_2H_4OCOCH_3$ | reddish blue |
| 42 | $C_2H_5$ | Cl | CN | $NHCOCH(CH_3)_2$ | H | $C_2H_5$ | $C_2H_5$ | blue |
| 43 | $C_2H_5$ | Cl | CN | $NHCOCH_3$ | H | $C_2H_4CN$ | $C_2H_5$ | reddish blue |
| 44 | $C_2H_5$ | Cl | $CO_2C_2H_5$ | $NHCOCH_3$ | H | $C_2H_5$ | $C_2H_5$ | reddish blue |
| 45 | $C_2H_5$ | Cl | $CO_2C_2H_5$ | $NHCOC_2H_5$ | $CH_3$ | $n-C_3H_7$ | $n-C_3H_7$ | reddish blue |
| 46 | $C_2H_5$ | Cl | $CO_2C_2H_5$ | $NHCOCH_2OCH_3$ | H | $C_2H_4OCH_3$ | $C_2H_4OCH_3$ | reddish blue |
| 47 | $C_2H_5$ | Cl | $CO_2C_2H_5$ | $NHCOCH_3$ | $OCH_3$ | $C_2H_4OCOCH_3$ | $C_2H_4OCOCH_3$ | blue |
| 48 | $C_2H_5$ | Cl | $CO_2C_2H_5$ | $CH_3$ | H | $C_2H_4CN$ | $C_2H_5$ | violet |
| 49 | $C_2H_5$ | Cl | $CO_2C_2H_5$ | H | H | $C_2H_4CN$ | $C_2H_4OCOCH_3$ | violet |
| 50 | $C_2H_5$ | Cl | $CO_2CH_3$ | $NHCOCH_3$ | H | $C_2H_5$ | $C_2H_5$ | blue |
| 51 | $C_4H_9$ | Cl | CN | $NHCOCH_3$ | H | $n-C_4H_9$ | $n-C_4H_9$ | blue |
| 52 | $C_4H_9$ | Cl | CN | $NHCOCH_3$ | H | $C_2H_4OH$ | $C_2H_4OH$ | reddish blue |
| 53 | $C_4H_9$ | Cl | CN | $NHCOCH_2OC_6H_5$ | H | $C_2H_5$ | $C_2H_5$ | blue |
| 54 | $C_4H_9$ | Cl | CN | $CH_3$ | H | $C_2H_5$ | $C_2H_5$ | bluish violet |
| 55 | $C_4H_9$ | Cl | CN | H | H | $C_2H_5$ | $C_2H_5$ | violet |
| 56 | $C_4H_9$ | Cl | CN | $NHCOCH_3$ | H | $C_2H_5$ | $C_2H_5$ | blue |
| 57 | $C_4H_9$ | Cl | CN | $NHCOCH_3$ | $OCH_3$ | $C_2H_4OCOCH_3$ | $C_2H_4OCOCH_3$ | greenish blue |
| 58 | $C_3H_7$ | Br | CN | $NHCOCH_3$ | H | $n-C_3H_7$ | $n-C_3H_7$ | blue |
| 59 | $C_3H_7$ | Br | CN | $CH_3$ | H | $C_2H_5$ | $C_2H_4CN$ | violet |
| 60 | $C_4H_9$ | Cl | CN | $CH_3$ | $OCH_3$ | $C_2H_4OCOCH_3$ | $C_2H_4OCOCH_3$ | blue |
| 61 | $CH_3$ | (1) | CN | $CH_3$ | H | $C_2H_5$ | $C_2H_4OH$ | reddish |
| 62 | $CH_2C_6H_5$ | (2) | CN | $NHCOCH_3$ | H | $C_2H_5$ | $C_2H_5$ | reddish blue |
| 63 | $CH_2C_6H_5$ | (2) | CN | $CH_3$ | H | $C_2H_4OH$ | $C_2H_4OH$ | bluish violet |
| 64 | $CH_2C_6H_5$ | (2) | CN | $CH_3$ | H | $C_2H_5$ | $C_2H_4CN$ | violet |
| 65 | $C_2H_5$ | (3) | CN | $NHCOCH_3$ | H | $C_4H_9$ | $C_4H_9$ | blue |
| 66 | $C_2H_5$ | (3) | CN | $NHCOC_2H_5$ | H | $C_2H_4OCOCH_3$ | $C_2H_4OCOCH_3$ | reddish blue |
| 67 | $C_2H_5$ | (3) | CN | $NHCOCH_2OCH_3$ | H | $C_2H_5$ | $C_2H_5$ | blue |
| 68 | $C_2H_5$ | (3) | CN | H | H | $C_2H_4CN$ | $C_2H_5$ | violet |
| 69 | $C_2H_5$ | (4) | CN | $CH_3$ | H | $C_2H_4CN$ | $C_2H_5$ | violet |
| 70 | $C_2H_5$ | (4) | CN | $NHCOCH_3$ | $OCH_3$ | $C_2H_5$ | $C_2H_5$ | greenish blue |
| 71 | $C_2H_5$ | (4) | CN | $NHCOCH_3$ | H | $C_2H_5$ | $C_2H_5$ | blue |
| 72 | $C_2H_5$ | (4) | CN | $NHCOC_2H_5$ | H | $C_2H_4OH$ | $C_2H_4OH$ | blue |
| 73 | $C_2H_5$ | (4) | CN | $NHCOCH_3$ | H | $C_2H_4CN$ | $C_2H_5$ | reddish blue |
| 74 | $C_4H_9$ | (5) | CN | $NHCOCH_3$ | H | $C_3H_7$ | $C_3H_7$ | blue |
| 75 | $C_4H_9$ | (5) | CN | $NHCOCH_3$ | $OC_2H_5$ | $C_2H_4CN$ | $CH_2CH=CH_2$ | greenish blue |
| 76 | $C_4H_9$ | (5) | CN | $NHCOCH_3$ | H | $CH_2CH=CH_2$ | $CH_2CH=CH_2$ | reddish blue |
| 77 | $C_4H_9$ | (5) | CN | $NHCOCH_2OCH_3$ | H | $C_2H_4OCOCH_3$ | $C_2H_4OCOCH_3$ | reddish blue |
| 78 | $C_4H_9$ | (5) | CN | $NHCOCH_2Cl$ | H | $C_4H_9$ | $C_4H_9$ | blue |
| 79 | $C_4H_9$ | (5) | CN | $CH_3$ | H | $C_2H_4OH$ | $C_2H_5$ | bluish violet |
| 80 | (6) | Cl | CN | $NHCOCH_3$ | H | $C_4H_9$ | $C_4H_9$ | blue |

(1) = $C_6H_5$
(2) = $CH_3$
(3) = $SC_6H_5$
(4) = $SO_2C_6H_5$
(5) = $OC_2H_5$
(6) = $CH_2CH=CH_2$

The method of Example 15 is also employed to obtain the dyes of the formula

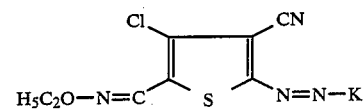

listed in Table 3.

TABLE 3

| Ex. No. | K | Hue on PES |
|---|---|---|
| 81 | [structure: 2,N-ethyl-N-(2,4,4-trimethylpentan-2-yl)-aminotoluene derivative] | blue |
| 82 | [structure: similar with N-C₂H₄OH and additional H₃C] | blue |
| 83 | [structure: similar with NHCOCH₃ substituent and N-C₂H₅] | blue |
| 84 | [structure: phenyl with O-CH₂CH(CH₃)- ring, N-(CH₂)₃CH₃, H₃C] | blue |
| 85 | [4-methylnaphthalen-1-yl]-NH—CH₂CHOHCH₂OH | blue |
| 86 | [4-methylnaphthalen-1-yl]-NH—CH₂CHOHCH₂OCH₂C≡CH | blue |
| 87 | [4-methylnaphthalen-1-yl]-NH—C₂H₄COOC₂H₅ | blue |

TABLE 3-continued

| Ex. No. | K | Hue on PES |
|---|---|---|
| 88 | $H_5C_6$, thiophene with $-N=$, $-N(CH_2CH_2CH_2CH_3)_2$ | blue |
| 89 | $H_5C_6$, thiophene with $-N=$, $-NHC_6H_5$ | blue |
| 90 | $H_5C_6$, thiophene with $-N=$, morpholino | blue |
| 91 | $H_5C_6$, CN, thiophene, $-N(C_2H_5)_2$ | blue |
| 92 | $H_3C$, CN, thiophene, morpholino | blue |
| 93 | $H_3C$, CN, pyridine, $-NHC_3H_6OC_4H_8OH$, $NHC_2H_4OCH_3$ | reddish violet |
| 94 | $H_3C$, CN, pyridine, $-NHC_3H_6OC_4H_8OCOCH_3$, $NH_2$ | reddish violet |
| 95 | $H_3C$, CN, pyridine, $-NH$-phenyl, $NHC_2H_4OCOCH_3$ | violet |
| 96 | $H_3C$, CN, pyridine, $-NH(CH_2)_3O(CH_2)_2O$-phenyl, $NHC_2H_4OH$ | reddish violet |

We claim:
1. A thiophene-containing azo dye of the formula

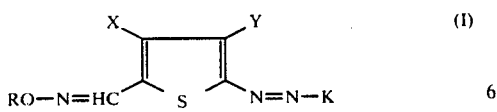

where R is $C_1$–$C_{12}$ alkyl or $C_1$–$C_2$ alkyl substituted by chlorine, bromine, $C_1$–$C_4$-alkoxy, phenyl or phenoxy, $C_3$–$C_6$ alkenyl or $C_3$–$C_6$ alkenyl substituted by chlorine, bromine, $C_1$–$C_4$-alkoxy, phenyl or phenoxy, phenyl or phenyl substituted by halogen, $C_1$–$C_4$-alkyl or $C_1$–$C_4$-alkoxy, X is hydrogen, halogen, hydroxyl, $C_1$–$C_8$ alkoxy, $C_1$–$C_8$-alkoxy substituted by phenyl, $C_5$–$C_7$-cycloalkoxy, phenoxy, phenoxy substituted by halogen, $C_1$–$C_4$-alkyl or $C_1$–$C_4$-alkoxy, mercapto, alkylthio, alkylthio substituted by hydroxyl-, $C_1$–$C_4$-alkoxycarbonyl- or phenyl, C₅-C₇-cycloalkylthio, phenylthio, phenylthio substituted by halogen, C₁-C₄-alkyl or C₁-C₈ alkoxy, C₁-C₄-alkylsulfonyl, phenylsulfonyl, phenylsulfonyl substituted by halogen, C₁-C₄-alkyl or C₁-C₄ alkoxy, C₁-C₈-alkyl, phenyl substituted by halogen, C₁-C₄-alkyl or C₁-C₄-alkoxy; Y is cyano, nitro, C₁-C₁₀-alkanoyl, benzoyl, benzoyl substituted by halogen, C₁-C₄-alkyl or C₁-C₄-alkoxy, C₁-C₄-alkylsulfonyl, phenylsulfonyl, phenylsulfonyl substituted by halogen, C₁-C₄-alkyl or C₁-C₄-alkoxy, or CO—Z where Z is hydroxyl, C₁-C₈ alkoxy, C₁-C₈ alkoxy substituted by hydroxyl- or C₁-C₄-alkoxy, phenoxy, phenoxy substituted by halogen, C₁-C₄-alkyl or C₁-C₄-alkoxy, amino, C₁-C₈-mono- or dialkylamino, pyrrolidino, piperidino, morpholino or N-(C₁-C₄-alkyl)piperazino and K is the radical of a coupling component of the formulae II to X:

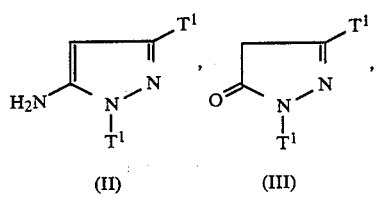

(II) (III)

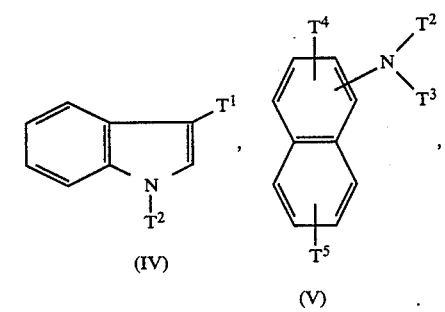

(IV) (V)

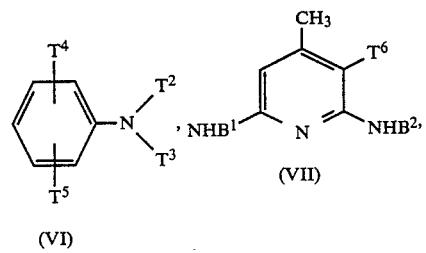

(VI) (VII)

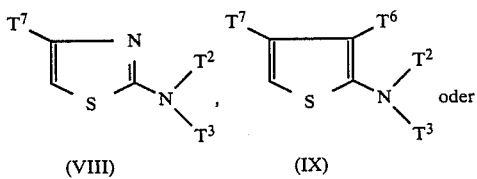

(VIII) (IX)

-continued

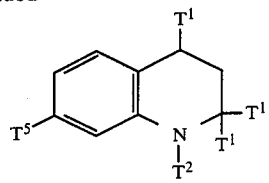

(X)

where B¹ is hydrogen or B², B² is C₁-C₈ alkyl, C₁-C₈ alkyl substituted by chlorine, bromine, hydroxyl, C₁-C₈-alkoxy, phenoxy, phenyl, cyano, carboxyl, C₁-C₈-alkanoyloxy, C₁-C₈-alkanoyloxy-C₁-C₄-alkoxy, C₁-C₈-alkoxy-C₁-C₄-alkoxy, benzoyloxy, o-, m- or p-methylbenzoyloxy, o-, m- or p-chlorobenzoyloxy, C₁-C₈-alkoxy-C₁-C₈-alkanoyloxy, phenoxy-C₁-C₈-alkanoyloxy, C₁-C₈-alkoxycarbonyloxy, C₁-C₈-alkoxy-C₁-C₈-alkoxycarbonyloxy, benzyloxycarbonyloxy, phenethoxycarbonyloxy, phenoxyethoxy-carbonyloxy, C₁-C₈-alkylaminocarbonyloxy, cyclohexylaminocarbonyloxy, phenylaminocarbonyloxy, C₁-C₈-alkoxycarbonyl, C₁-C₈-alkoxy-C₁-C₈-alkoxycarbonyl, phenoxycarbonyl, benzyloxycarbonyl, phenoxy-C₁-C₄-alkoxy or phenylethoxycarbonyl, C₅-C₇ cycloalkyl, C₅-C₇ cycloalkyl substituted by C₁-C₄-alkyl, C₁-C₄-alkoxy, C₂-C₄-hydroxy-alkyl or hydroxyl, phenyl, C₃-C₆-alkenyl or acyl, T¹ is hydrogen, C₁-C₄ alkyl, C₁-C₄ alkyl substituted by phenyl, phenyl, or phenyl substituted by halogen or alkyl; T² is hydrogen or T³, T³ is C₁-C₆ alkyl, C₁-C₆ alkyl substituted by chlorine, bromine, hydroxyl, C₁-C₈-alkoxy, phenoxy, cyano, carboxyl, phenyl C₁-C₈-alkanoyloxy, C₁-C₈-alkoxy-C₁-C₄-alkoxy, benzoyloxy, o-, m- or p-methylbenzoyloxy, o-, m- or p-chlorobenzoyloxy, C₁-C₈-alkoxy-C₁-C₈-alkanoyloxy, phenoxy-C₁-C₈-alkanoyloxy, C₁-C₈-alkoxycarbonyloxy, C₁-C₈-alkoxy-C₁-C₈-alkoxycarbonyloxy, benzyloxycarbonyloxy, phenethoxycarbonyloxy, phenoxyethoxy-carbonyloxy, C₁-C₈-alkylaminocarbonyloxy, cyclohexylaminocarbonyloxy, phenylaminocarbonyloxy, C₁-C₈-alkoxycarbonyl, C₁-C₈-alkoxy-C₁-C₈-alkoxycarbonyl, phenoxy-carbonyl, benzyloxycarbonyl, phenoxy-C₁-C₄-alkoxy or phenylethoxycarbonyl, C₅-C₇-cycloalkyl, C₃-C₆-alkenyl or phenyl, T⁴ and T⁵ are each, independently of the other, hydrogen, C₁-C₄-alkyl, C₁-C₄-alkoxy, phenoxy, benzyloxy, halogen, C₁-C₄-alkyl-sulfonylamino, C₁-C₄-dialkylaminosulfonylamino, C₁-C₄-alkoxycarbonylamino, benzoylamino or C₁-C₆-alkanoylamino, T⁶ is cyano, nitro, acetyl, carbamoyl, C₁-C₄-mono- or -dialkylcarbamoyl, C₁-C₄-alkoxycarbonyl or C₁-C₄-alkoxyethoxycarbonyl; and T⁷ is C₁-C₁₀ alkyl, C₁-C₁₀ alkyl substituted by cyano-, C₁-C₄-alkoxycarbonyl- or phenyl, phenyl, halogen nitro, C₁-C₁₀ alkoxy, C₁-C₁₀-alkoxy substituted by C₁-C₄ alkoxy, phenoxy, benzyloxy, C₁-C₄-alkylthio, phenylthio, C₁-C₄-mono- or dialkylamino, C₁-C₅-alkanoylamino or C₁-C₄-alkoxycarbonyl.

2. A thiophene-containing azo dye as claimed in claim 1, wherein R is C₁-C₈ alkyl or C₃-C₅-alkenyl, X is hydrogen, chlorine, bromine, C₁-C₄-alkoxy, phenylthio, phenylsulfonyl, C₁-C₄-alkyl or phenyl, Y is cyano or CO—Z where Z is C₁-C₄-alkoxy.

* * * * *